G. G. SKELTON.
STEAMING RECEPTACLE.
APPLICATION FILED OCT. 7, 1920.

1,361,552.

Patented Dec. 7, 1920.
2 SHEETS—SHEET 1.

Witness:
Stephen T. Kelso

Inventor:
George G. Skelton
by Banning Banning
Attys.

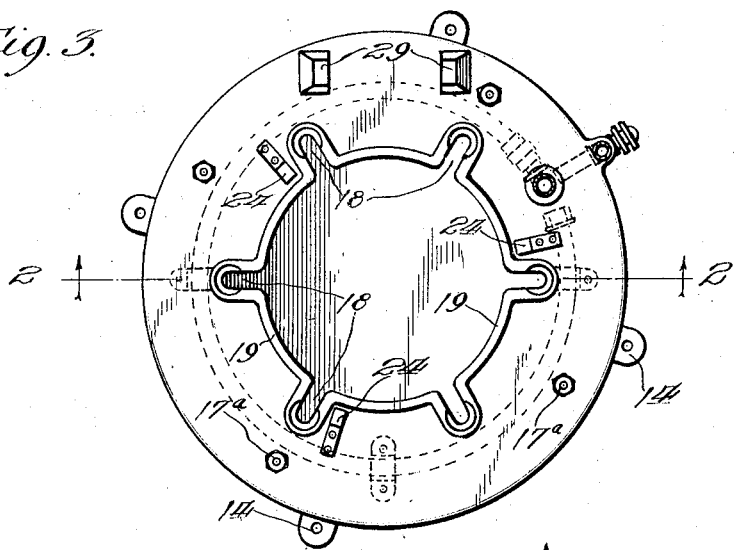
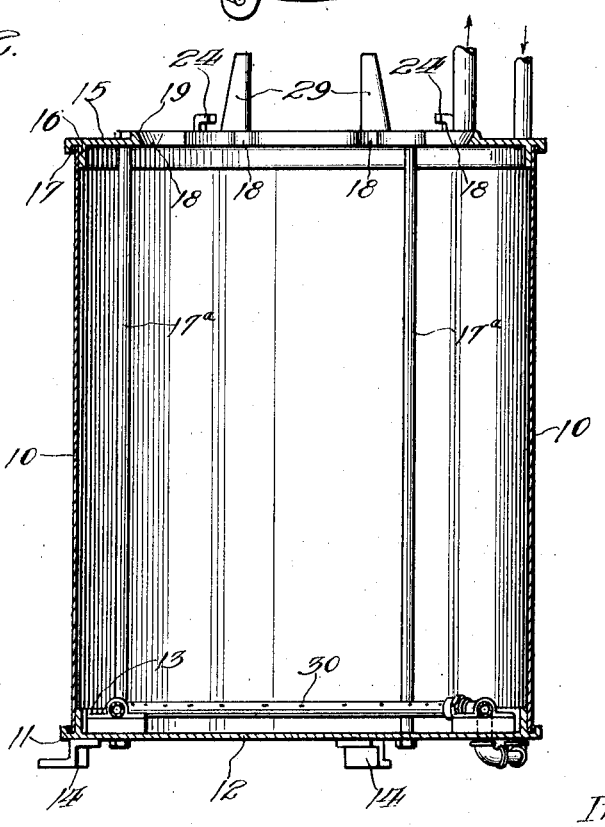

UNITED STATES PATENT OFFICE.

GEORGE G. SKELTON, OF CLINTON, IOWA, ASSIGNOR TO THE COLLIS COMPANY, OF CLINTON, IOWA, A CORPORATION OF IOWA.

STEAMING-RECEPTACLE.

1,361,552.  Specification of Letters Patent.  Patented Dec. 7, 1920.

Application filed October 7, 1920. Serial No. 415,352.

*To all whom it may concern:*

Be it known that I, GEORGE G. SKELTON, a citizen of the United States, residing at Clinton, in the county of Clinton and State of Iowa, have invented certain new and useful Improvements in Steaming-Receptacles, of which the following is a specification.

The steaming receptacle of the present invention is designed as an improvement over that shown in Letters Patent of the United States No. 1,310,931, granted July 22, 1919, and is designed primarily for the purpose of steaming ducks, geese, and other fowls, although the same is not restricted for this purpose.

The object of the invention is to so construct the top of the receptacle as to provide recesses for suspending the geese or other fowls by the neck in such manner as to permit the body of the fowl within the receptacle to be subjected to the steaming action without concurrently steaming the head of the fowl and thereby injuring its appearance. The cover is so designed that it will, conjointly with the recessed top, afford a plurality of openings of the proper size to so engage the neck of a fowl that a substantially steam-tight joint around the fowl's neck will be afforded, thereby preventing egress of steam from the interior of the receptacle, with a consequent loosening of the device upon the head and a discoloration of the eyes.

The invention is so designed that the application of the cover will not only afford a steam-tight closure for the receptacle, but will also act as a clamp to hold the suspended fowls tightly in place.

In the drawings:

Fig. 2 is a sectional elevation thereof;

Fig. 3 is a top or plan view with the cover removed; and

Figure 4:
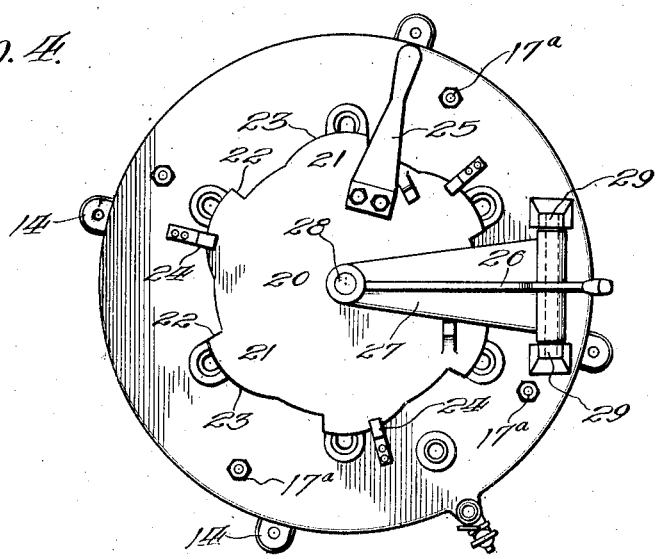
Fig. 4 is a top or plan view with the cover clamped in position.
Figure 1:
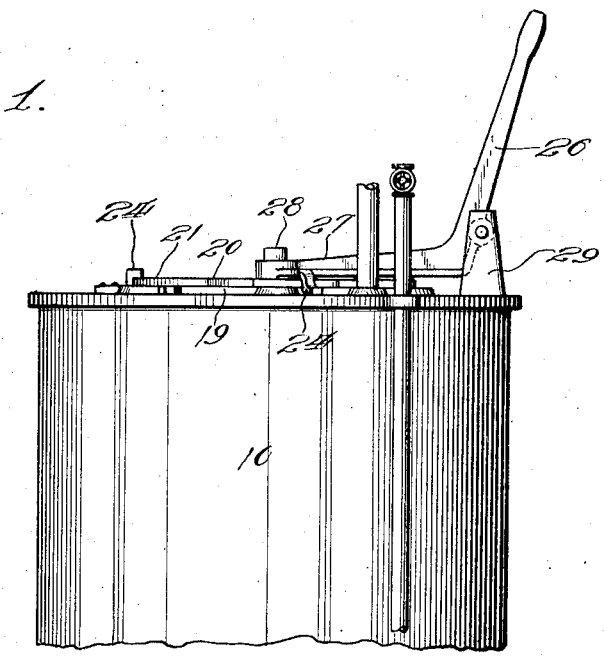
Figure 1 is a side elevation of the steamer of the present invention.

The steamer comprises a cylindrical body wall 10, preferably of sheet metal, the lower edge of which is entered into and sealed within a circular groove 11 in a base plate 12, which plate is provided near its edge with a rim or flange 13 which abuts against the inside of the cylindrical body, and, in conjunction with the sealed groove 11, affords a tight closure. The base plate is provided with legs 14 to afford a firm support for the steamer. The bottom of the base plate coöperates with a ring-shaped plate 15 provided with a flange 16 and a sealing groove 17 similar to those provided on the base plate, and the tops of the base plate are held in clamped relation to the body by means of through bolts $17^a$, four of such bolts being shown.

The ring-shaped top plate 15 is provided at recurrent intervals with radially arranged recesses 18 open toward the center and of a width sufficient to permit the neck of a fowl to be inserted in each one. The inner rim of the top plate is provided at all points with a slightly elevated marginal flange 19 which is ground faced to afford a tight joint with the cover 20 when the latter is applied to closing position.

The cover is provided at recurrent intervals with outwardly projecting tongues 21 which are formed to have an abrupt forward edge 22 and an inwardly curving rear edge 23, which latter presents an easy surface for forcing the neck of the fowl tightly within the bottom of the co-acting recess in the top plate. The cover is held closely against the top surface of the steamer by the provision of a plurality of overhanging clip fingers 24 which are positioned and proportioned to overlie and engage tongues 21, but are not of a length to overlie and engage the intermediate marginal portions of the cover. The cover is provided with a side handle 25 for rotating the cover, and an upstanding handle 26 for lifting the same.

The handle 26 projects upwardly from a bracket 27 which projects inwardly to the center of the cover and is provided with a pivotal connection 28 therewith, and the rear portion of the bracket is hinged between standards 29, so that by drawing back on the upstanding handle 26 the bracket, with the cover attached thereto, will be swung back and the opening exposed for the purpose of securing access to the interior of the receptacle. The receptacle is provided on its interior with one or more steam coils 30 for the purpose of supplying the necessary steam.

In using the present invention the handle 25 is turned to the proper position to release the tongues or lugs 21, after which the handle 26 is drawn back, tilting the cover upon its hinge and exposing the opening into the interior of the receptacle. The fowls are suspended by the neck within the recesses 18, the necks being clamped in place when the cover is lowered and turned back to locked position. The steam is then turned on and the body of the fowl is steamed to the desired degree to permit a removal of the feathers, without, however, impairing the appearance of the fowl's head which remains in presentable condition for the market.

It will be seen that the construction of the cover is such that the lugs or tongues 21 not only subserve a locking function but also serve a sealing function in forcing and holding the necks of the fowls tightly within the respective recesses.

I claim:

1. In a device of the class described, the combination of a receptacle adapted to receive the body of a fowl or the like, said receptacle being provided with a recess configured to receive and closely embrace the neck of the fowl, means for clamping and holding the neck within the recess, and means for admitting steam to the interior of the receptacle, substantially as described.

2. In a device of the class described, the combination of a receptacle adapted to receive the body of a fowl or the like, said receptacle being provided with an opening of a size to admit the body of the fowl to the interior, said opening being configured at one point to provide a recess adapted to receive and closely embrace the neck of the fowl, means for clamping and holding the neck within the recess, and means for admitting steam to the interior of the receptacle, substantially as described.

3. In a device of the class described, the combination of a receptacle adapted to receive the body of a fowl or the like, said receptacle being provided with an opening of a size to admit the body of the fowl to the interior, said opening being configured at one point to provide a recess adapted to receive and closely embrace the neck of the fowl, a cover of a size to afford a closure for the opening and to serve the function of clamping the neck of the fowl within the recess, and means for admitting steam to the interior of the receptacle, substantially as described.

4. In a device of the class described, the combination of a receptacle of a size to receive the body of a fowl, said receptacle being provided at one end with an opening of a size to admit the insertion of the body of the fowl, the opening having recesses at recurrent intervals, each recess being of a size to closely embrace the neck of the fowl, a cover of a size to overlie the unrecessed portions of the opening in the receptacle and adapted to clamp the head of each fowl within its recess, and means for tilting the cover, substantially as described.

5. In a device of the class described, the combination of a receptacle of a size to receive the body of a fowl, said receptacle being provided at one end with an opening of a size to admit the insertion of the body of the fowl, the opening having recesses at recurrent intervals, each recess being of a size to closely embrace the neck of a fowl, a cover of a size to overlie the unrecessed portions of the opening in the receptacle and adapted to clamp the head of each fowl within its recess, hinged brackets supporting the cover, and means for tilting the bracket to lift the cover, substantially as described.

6. In a device of the class described, the combination of a receptacle of a size to receive the body of a fowl, said receptacle being provided at one end with an opening of a size to admit the insertion of the body of the fowl, the opening having recesses at recurrent intervals, each recess being of a size to closely embrace the neck of a fowl, a cover of a size to overlie the unrecessed portion of the opening in the receptacle and adapted to clamp the head of each fowl within its recess, hinged brackets supporting the cover, means for tilting the bracket to lift the cover, means for rotating the cover with respect to the bracket, and locking means adapted to engage the cover when rotated to one position and release the same when rotated to another position, substantially as described.

7. In a device of the class described, the combination with a receptacle closed at its bottom and provided at its top with a ring-shaped top wall provided with an opening of a size to receive the body of a fowl, the marginal edge of said opening being configured at recurrent intervals to afford recesses, each recess being of a size to receive the neck of a fowl, a cover of a size to overlap the unrecessed portions of the opening, the edge of the cover being provided with projecting tongues or lugs adapted to clamp the necks of the fowls within the respective recesses, and means for rotating the cover, substantially as described.

8. In a device of the class described, the combination with a receptacle closed at its bottom and provided at its top with a ring-shaped top wall provided with an opening of a size to receive the body of a fowl, the marginal edge of said opening being configured at recurrent intervals to afford recesses, each recess being of a size to receive the neck of a fowl, a cover of a size to overlap the unrecessed portions of the opening, the edge of the cover being provided with projecting tongues or lugs adapted to clamp the necks of the fowls within the respective recesses, means for rotating the cover, and overhanging clip fingers adapted to engage the tongues or lugs when turned to locking position and adapted to permit the release thereof when turned to releasing position, substantially as described.

9. In a device of the class described, the combination with a receptacle closed at its bottom and provided at its top with a ring-shaped top wall provided with an opening of a size to receive the body of a fowl, the marginal edge of said opening being configured at recurrent intervals to afford recesses, each recess being of a size to receive the neck of a fowl, a cover of a size to overlap the unrecessed portions of the opening, the edge of the cover being provided with projecting tongues or lugs adapted to clamp the necks of the fowls within the respective recesses, means for rotating the cover, a hinged bracket from which the cover is rotatably suspended, and a handle for swinging the bracket on its hinge and lifting the cover, substantially as described.

10. In a device of the class described, the combination with a receptacle closed at its bottom and provided at its top with a ring-shaped top wall provided with an opening of a size to receive the body of a fowl, the marginal edge of said opening being configured at recurrent intervals to afford recesses, each recess being of a size to receive the neck of a fowl, a cover of a size to overlap the unrecessed portions of the opening, the edge of the cover being provided with projecting tongues or lugs adapted to clamp the necks of the fowls within the respective recesses, means for rotating the cover, overhanging clip fingers adapted to engage the tongues or lugs when turned to locking position and adapted to permit the release thereof when turned to releasing position, a hinged bracket from which the cover is rotatably suspended, and a handle for swinging the bracket on its hinge and lifting the cover, substantially as described.

GEORGE G. SKELTON.